(12) United States Patent
Bedworth

(10) Patent No.: US 9,567,224 B2
(45) Date of Patent: Feb. 14, 2017

(54) METHODS FOR PERFORATING GRAPHENE USING AN ACTIVATED GAS STREAM AND PERFORATED GRAPHENE PRODUCED THEREFROM

(71) Applicant: LOCKHEED MARTIN CORPORATION, Bethesda, MD (US)

(72) Inventor: Peter V. Bedworth, Los Gatos, CA (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 743 days.

(21) Appl. No.: 13/795,276

(22) Filed: Mar. 12, 2013

(65) Prior Publication Data

US 2013/0249147 A1 Sep. 26, 2013

Related U.S. Application Data

(60) Provisional application No. 61/613,938, filed on Mar. 21, 2012.

(51) Int. Cl.
  *C01B 31/04* (2006.01)
  *B82Y 40/00* (2011.01)
  *B82Y 30/00* (2011.01)

(52) U.S. Cl.
  CPC ............ *C01B 31/0484* (2013.01); *B82Y 30/00* (2013.01); *B82Y 40/00* (2013.01); *C01B 31/0438* (2013.01); *Y10S 977/847* (2013.01); *Y10S 977/888* (2013.01)

(58) Field of Classification Search
  CPC ............ C01B 31/0438; C01B 31/0484; Y10S 977/847; Y10S 977/888; B82Y 30/00; B82Y 40/00
  USPC ............................. 264/483, 423; 216/56, 81
  See application file for complete search history.

(56) References Cited

U.S. PATENT DOCUMENTS

| 5,925,247 | A | 7/1999 | Huebbel ................... 210/321.75 |
| 7,014,829 | B2 | 3/2006 | Yanagisawa et al. ..... 423/447.1 |
| 8,147,599 | B2 | 4/2012 | McAlister ....................... 96/154 |
| 8,361,321 | B2 | 1/2013 | Stetson et al. |
| 9,028,663 | B2 | 5/2015 | Stetson et al. |

(Continued)

FOREIGN PATENT DOCUMENTS

| CN | 101996853 | 3/2011 |
| CN | 102344132 | 2/2012 |

(Continued)

OTHER PUBLICATIONS

Verdonck, P., "Plasma Etching", in Oficina de Microfabriçāo: Projeto e Construçāo de CI's MOS, Swart, J.W., Ed., Campinas (Sao Paulo, Brazil): UNICAMP, 2006, ch. 10, p. 9.*

(Continued)

*Primary Examiner* — Alison L Hindenlang
*Assistant Examiner* — Lawrence D Hohenbrink, Jr.
(74) *Attorney, Agent, or Firm* — Foley & Lardner LLP

(57) ABSTRACT

Graphene sheets having a plurality of holes in their basal planes are described herein. Methods for making the graphene sheets can involve contacting graphene sheets with an activated gas that has contacted a helium or argon atmospheric pressure plasma. The size and/or number of holes introduced can be altered by changing the contact time, the stand-off distance, the activated gas concentration, and/or the plasma power. Polymer composites containing the perforated graphene sheets are also described.

20 Claims, 2 Drawing Sheets

(56) References Cited

U.S. PATENT DOCUMENTS

| | | | |
|---|---|---|---|
| 9,067,811 B1 | 6/2015 | Bennett et al. | |
| 9,095,823 B2 | 8/2015 | Fleming | |
| 9,193,587 B2 | 11/2015 | Bennett | |
| 2009/0176159 A1 | 7/2009 | Zhamu et al. | |
| 2011/0073563 A1* | 3/2011 | Chang | B82Y 30/00 216/44 |
| 2011/0201201 A1* | 8/2011 | Arnold | B82Y 30/00 438/694 |
| 2012/0048804 A1 | 3/2012 | Stetson et al. | 210/653 |
| 2012/0255899 A1 | 10/2012 | Choi et al. | 210/489 |
| 2013/0015136 A1 | 1/2013 | Bennett et al. | |
| 2013/0105417 A1 | 5/2013 | Stetson et al. | |
| 2013/0240355 A1 | 9/2013 | Ho et al. | |
| 2013/0248367 A1 | 9/2013 | Stetson et al. | |
| 2013/0256210 A1 | 10/2013 | Fleming | |
| 2013/0256211 A1 | 10/2013 | Fleming | |
| 2013/0277305 A1 | 10/2013 | Stetson et al. | |
| 2014/0261999 A1 | 9/2014 | Stetson et al. | |
| 2014/0263035 A1 | 9/2014 | Stoltenberg et al. | |
| 2014/0263178 A1 | 9/2014 | Sinton et al. | |
| 2014/0272286 A1 | 9/2014 | Stoltenberg et al. | |
| 2014/0377738 A1 | 12/2014 | Bachmann et al. | |
| 2015/0075667 A1 | 3/2015 | McHugh et al. | |
| 2015/0217219 A1 | 8/2015 | Sinsabaugh et al. | |
| 2015/0218210 A1 | 8/2015 | Stetson et al. | |
| 2015/0221474 A1 | 8/2015 | Bedworth | |
| 2015/0247178 A1 | 9/2015 | Mountcastle et al. | |
| 2015/0258254 A1 | 9/2015 | Simon et al. | |
| 2015/0258498 A1 | 9/2015 | Simon et al. | |
| 2015/0258502 A1 | 9/2015 | Turowski | |
| 2015/0258503 A1 | 9/2015 | Sinton et al. | |
| 2015/0258525 A1 | 9/2015 | Westman et al. | |
| 2015/0268150 A1 | 9/2015 | Newkirk et al. | |
| 2015/0321147 A1 | 11/2015 | Fleming et al. | |
| 2015/0336202 A1 | 11/2015 | Bedworth et al. | |

FOREIGN PATENT DOCUMENTS

| | | | |
|---|---|---|---|
| JP | H09232293 A * | 9/1997 | |
| JP | 2004-179014 | 6/2004 | |
| JP | 2011-241479 | 12/2011 | |
| KR | 10-2012002216 A | 3/2012 | B01D 39/20 |
| WO | WO 2011/075158 | 6/2011 | |
| WO | WO 2011/094204 A2 | 8/2011 | |
| WO | WO 2012/006657 A1 | 1/2012 | |
| WO | WO 2012/028695 | 3/2012 | |
| WO | WO 2012/030368 A1 | 3/2012 | |

OTHER PUBLICATIONS

JPH09232293 Machine Translation JAP to ENG.*
Childres et al.; *Effect of Oxygen Plasma Etching on Graphene Studied Using Raman Spectroscopy and Electronic Transport Measurements*; New Journal of Physics; Feb. 2011; Institute of Physics Publishing; GBR; vol. 13; Feb. 2011.
Kim et al.; *The Structural and Electrical Evolution of Graphene by Oxygen Plasma induced Disorder*; Nanotechnology 10P Publishing Ltd.; UK, vol. 20, No. 37; Sep. 16, 2009.
Zhang et al.; *Method for Anisotropic Etching of Graphite or Graphene*; Database CA (on line); Chemical Abstracts Service, Columbus, OH; Apr. 28, 2011.
Jingwei Bai et al.; *Graphene Nanomesh*; Nature Nanotechnology; Feb. 14, 2010.
Jiang et al.; *Porous Graphene as the Ultimate Membrane for Gas Separation*; Nano Letters; Dec. 9, 2009; American Chemical Society, USA; vol. 9, No. 12; Dec. 9, 2009.
International Search Report in corresponding application No. PCT/US2013/030344 mailed Jun. 19, 2013.
Written Opinion in corresponding application No. PCT/US2013/030344 mailed Jun. 19, 2013.
Mishra et al.; *Functionalized Graphene Sheets for Arsenic Removal and Desalination of Sea Water*; Desalination, Elsevier, Amsterdam, NL; vol. 282; Jan. 13, 2011.
Karan et al.; *Ultrafast Viscous Permeation of Organic Solvents Through Diamond-Like Carbon Nanosheets*; Science; vol. 335; Jan. 27, 2012; pp. 444-447.
Nair et al; *Unimpeded Permeation of Water Through Helium-Leak-tight Graphene-Based Membranes*; Science; vol. 335; Jan. 27, 2012; pp. 442-443.
Jiang et al.; *Porous Graphene as the Ultimate Membrane for Gas Separation*; Nano Letters; Sep. 23, 2009; vol. 9, No. 12; pp. 4019-4024.
Suk et al.; *Water Transport Through Ultrathin Graphene*; Journal of Physical Chemistry Letters; Apr. 30, 2010; pp. 1590-1594.
Sint et al.; *Selective Ion Passage through Functionalized Graphene Nanopores*; JACS Communications; 2008 American Chemical Society; Jun. 10, 2008; pp. 16448-16449.
Paul, Donald R.; *Creating New Types of Carbon-Based Membranes*; Science; vol. 335; Jan. 27, 2012; pp. 413-414.
Cohen-Tanugi et al.; *Water Desalination across Nanoporous Graphene*; Nano Letters; American Chemical Society; Jun. 1, 2012; pp. A-G.
Kim et al. (Mar. 2010) "Fabrication and Characterization of Large-Area, Semiconducting Nanoperforated Graphene Materials," Nano Letters. 10(4):1125-1131.
Liu et al. (Jun. 2008) "Graphene Oxidation: Thickness-Dependent Etching and Strong Chemical Doping," Nano Lett. 8(7):1965-1970.
CN Office Action in Chinese Application No. 201380013988.9 mailed Aug. 18, 2016 (English translation not readily available).
Zhang et al. Modern Thin-Film Technology 284-285 (Metallurgical Industry Press, 1st ed. 2009) (English translation not readily available).
JP Office Action in Japanese Application No. 2015-501729 mailed Dec. 9, 2016 (English translation).
Xiaogan Liang et al., Formation of Bandgap and Subbands in Graphene Nanomeshes with Sub-10nm Ribbon Width Fabricated via Nanoimprint Lithography., Nano Letters, Jun. 11, 2010, pp. 2454-2460.

* cited by examiner

METHODS FOR PERFORATING GRAPHENE USING AN ACTIVATED GAS STREAM AND PERFORATED GRAPHENE PRODUCED THEREFROM

CROSS-REFERENCE TO RELATED APPLICATIONS

This application claims priority of U.S. Provisional Application No. 61/613,938 filed Mar. 21, 2012, which is incorporated herein by reference.

FIELD OF THE INVENTION

The present invention generally relates to graphene, and, more specifically, to methods for perforating graphene sheets with a plurality of holes. More particularly, the present invention is directed to graphene sheets with perforations and related methods to obtain apertures sized from 1 nm or less to 100 nm in size.

BACKGROUND OF THE INVENTION

Graphene has garnered widespread interest for use in a number of applications due to its favorable mechanical and electronic properties. The electrical conductivity of graphene can be influenced by the amount and type of chemical functionalization on the graphene and the quantity of defects in the graphene basal plane. Although pristine graphene typically displays the highest electrical conductivity values, it can sometimes be desirable to tune the electrical conductivity and adjust the band gap. Tailoring of the band gap can be accomplished by introducing a plurality of defects (holes) within the graphene basal plane. The band gap can be influenced by both the size and number of holes present.

Perforated graphene has also been found to have filtering capabilities. Indeed, it has been found that graphene with appropriately sized apertures can remove sodium ions and chlorine ions from water. This filtering capability is also believed to be adaptable to gasses, particulates, solutes, molecules and hydrocarbons, or any other nano-sized constituent from a medium.

It is known that apertures may be made by selective oxidation, by which is meant exposure to an oxidizing agent for a selected period of time. It is believed that apertures can also be laser-drilled. As described in the publication Nano Lett. 2008, Vol. 8, no. 7, pg 1965-1970, the most straightforward perforation strategy is to treat the graphene film with dilute oxygen in argon at elevated temperature. As described therein, through apertures or holes in the 20 to 180 nm range were etched in graphene using 350 mTorr of oxygen in 1 atmosphere (atm) argon at 500° C. for 2 hours. The paper reasonably suggests that the number of holes is related to defects in the graphene sheet and the size of the holes is related to the residence time. This is believed to be the preferred method for making the desired perforations in graphene structures comprising a single sheet or multiple sheets. The structures may be graphene nanoplatelets and graphene nanoribbons. Thus, apertures in the desired range can be formed by shorter oxidation times. Another more involved method as described in Kim et al. "*Fabrication and Characterization of Large Area, Semiconducting Nanoperforated Graphene Materials*," Nano Letters 2010 Vol. 10, No. 4, Mar. 1, 2010, pp 1125-1131 utilizes a self assembling polymer that creates a mask suitable for patterning using reactive ion etching. A P(S-blockMMA) block copolymer forms an array of PMMA columns that form vias for the RIE upon redeveloping. The pattern of holes is very dense. The number and size of holes is controlled by the molecular weight of the PMMA block and the weight fraction of the PMMA in the P(S-MMA). Either method has the potential to produce a perforated graphene sheet or sheets.

Currently, there are no methods for reliably introducing holes under about 2.5 nm in size to graphene. In the size range of about 2.5 nm to about 10 nm, current techniques for perforating graphene take many milliseconds per hole, and there is no ability to form multiple holes in a single operation. Above about 10 nm, multi-step but laborious lithography techniques can be used. None of these techniques are amenable to introducing holes over a wide surface area.

In view of the foregoing, simple techniques that allow a plurality of holes to be simultaneously introduced to a graphene sheet and the ability to adjust the hole size would be of considerable benefit in the art. The present invention satisfies this need and provides related advantages as well.

SUMMARY OF THE INVENTION

In light of the foregoing, it is a first aspect of the present invention to provide methods for perforating graphene using an activated gas stream and perforated graphene produced therefrom.

It is another aspect of the invention to provide a method for perforating graphene, by exposing a stream of gas into plasma to generate an activated gas stream, directing the activated gas stream toward a graphene sheet, and perforating the graphene sheet with the activated gas stream.

In one embodiment of the above, the method controls application of the activated gas stream to the graphene sheet so as to obtain desired aperture sizes in the graphene sheet.

It is one aspect of the above embodiment to form a composite sheet of the graphene sheet and a metallic substrate prior to the perforating step, or to form a composite sheet of the graphene sheet and a polymeric substrate after the perforating step.

In another embodiment of the above, the method obtains a desired aperture size of less than 5 nm in diameter.

In yet another embodiment of the above, the method obtains a desired aperture size of less than 10 nm in diameter.

In still another embodiment of the above, the method obtains a desired aperture size of less than 1.5 nm in diameter.

In still another embodiment of the above, the method obtains desired aperture sizes ranging from about 0.5 nm to about 1.5 nm in size.

Another embodiment of the above method adjusts an amount of time the activated gas stream is applied to the graphene sheet so as to obtain a desired range of aperture sizes.

Still another embodiment of the above method adjusts a stand off distance between the activated gas stream and the graphene sheet so as to obtain a desired range of aperture sizes in the graphene sheet.

Yet another embodiment of the above method adjusts a distance between the activated gas stream and the graphene sheet so as to obtain a desired aperture size in the graphene sheet.

A further embodiment of the above method adjusts a contact residence time of the activated gas stream upon the graphene sheet so as to obtain a desired aperture size in the graphene sheet.

Yet a further embodiment of the above method adjusts an amount of plasma power applied to the activated gas stream so as to obtain a desired aperture size in the graphene sheet.

Still a further embodiment of the above method selects one of oxygen, nitrogen or combinations thereof as the activated gas, and utilizes no more than 3% active gas in the activated gas stream.

Another further embodiment of the above method obtains a desired aperture size in the graphene sheet by adjusting at least one of either an amount of time the activated gas stream is applied to the graphene sheet, a distance between the activated gas stream and the graphene sheet, a contact residence time of the activated gas stream upon the graphene sheet, or an amount of plasma power applied to the activated gas stream.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure describes methods for introducing a plurality of holes into the basal plane of a graphene sheet. The methods involve contacting a graphene sheet with an activated gas that has been contacted with a plasma. And the methods allow the number of holes and their size to be easily adjusted.

Graphene sheets having a plurality of holes therein are also described. Such graphene sheets will also be referred to herein as "perforated graphene." In some embodiments, the holes can be about 5 nm in size or less. In some embodiments, the holes can be about 10 nm in size or less. In some embodiments, the holes can be about 100 nm in size or less. In some embodiments, the holes can be about 10 nm in size or more. And in other embodiments the holes can range from about 0.5 nm to about 1.5 nm.

In some embodiments, composite materials containing a polymer matrix and graphene sheets having a plurality of holes therein are described.

The foregoing has outlined rather broadly the features of the present disclosure in order that the detailed description that follows can be better understood. Additional features and advantages of the disclosure will be described hereinafter. These and other advantages and features will become more apparent from the following description.

Figure 1:
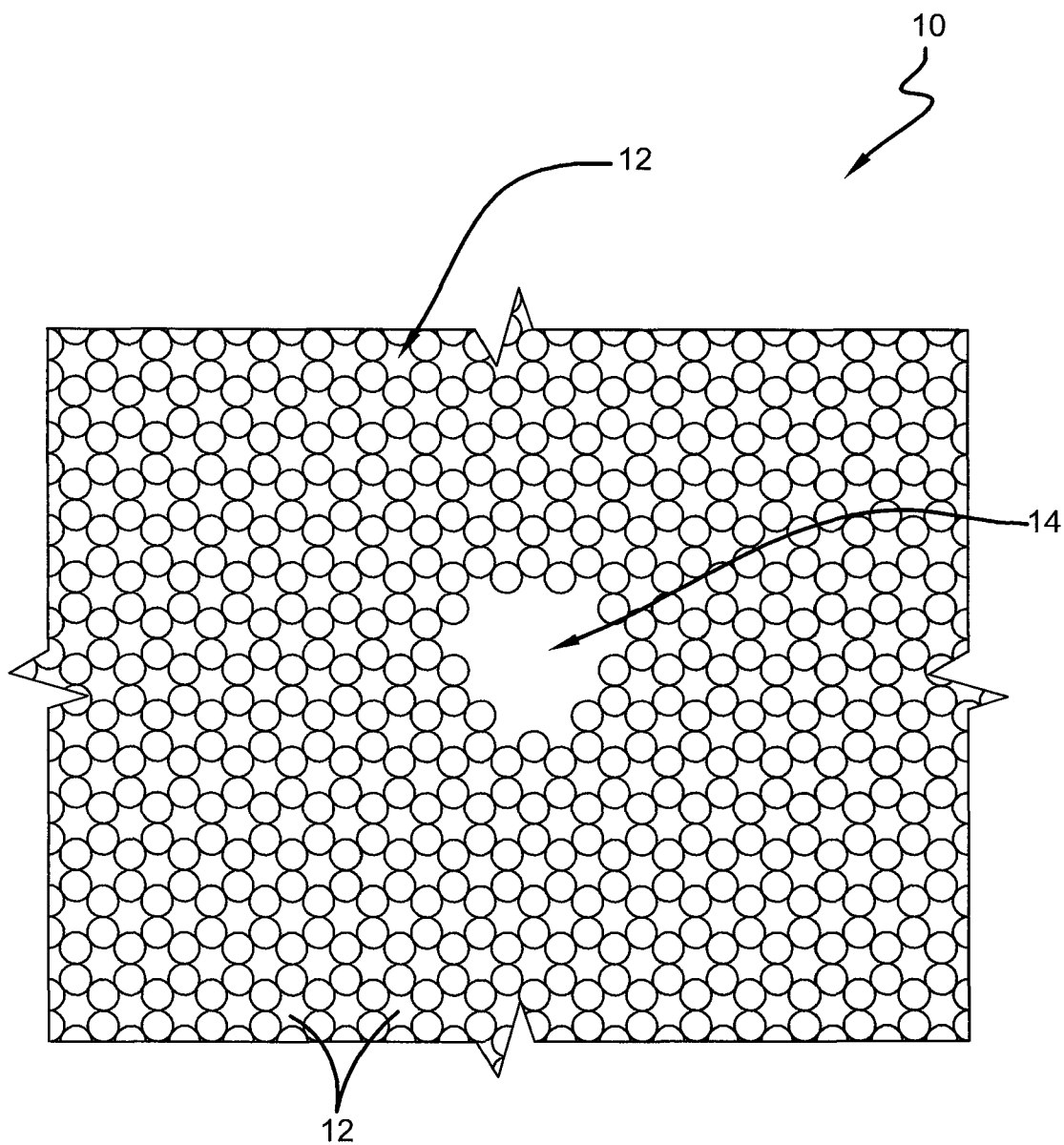
FIG. 1 is a plan representation of a perforated graphene sheet.

Graphene is a single-atomic-layer-thick layer of carbon atoms, bound together to define a sheet 10 as shown in FIG. 1. The thickness of a single graphene sheet is approximately 0.2 to 0.3 nanometers (nm). Multiple graphene sheets can be formed, having greater thickness and correspondingly greater strength. Multiple graphene sheets can be provided in multiple layers as the sheet is grown or formed. Or multiple graphene sheets can be achieved by layering or positioning one sheet on top of another. For all the embodiments disclosed herein, a single sheet of graphene or multiple graphene sheets may be used. Testing reveals that multiple layers of graphene maintain their integrity and function as a result of self-adhesion. This improves the strength of the sheet and in some cases flow performance. The carbon atoms of the graphene sheet define a repeating pattern of hexagonal ring structures (benzene rings) constructed of six carbon atoms, which form a honeycomb lattice of carbon atoms. An interstitial aperture 12 is formed by each six carbon atom ring structure in the sheet and this interstitial aperture is less than one nanometer across. Indeed, skilled artisans will appreciate that the interstitial aperture 12 is believed to be about 0.23 nanometers across its longest dimension. Accordingly, the dimension and configuration of the aperture 12 and the electron nature of the graphene precludes transport of any molecule across the graphene's thickness unless there are perforations. This dimension is much too small to allow the passage of either water or ions. Formation of the perforated graphene sheet 10 with one or more perforations 14 are made as will now be described.

The present disclosure is directed, in part, to graphene sheets containing a plurality of holes therein ("perforated graphene"). The present disclosure is also directed, in part, to methods for introducing a plurality of holes into graphene sheets. In addition, the present disclosure is also directed, in part, to polymer composites containing graphene sheets containing a plurality of holes therein.

Perforated graphene has a number of possible applications including, for example, use as a molecular filter, use as a defined band gap material, and use as an electrically conductive filler material with tunable electrical properties within polymer composites. Although a number of potential uses for perforated graphene exist, there is no reliable way of introducing holes to graphene in the size range of about 10 nm and under, and particularly about 5 nm and under. Multi-step but laborious lithography techniques can be used to fabricate holes greater than about 10 nm in size. No techniques are presently suitable, however, for fabrication of perforated graphene on the scale of square meters per minute or more.

In some embodiments, perforated graphene can be prepared by contacting a graphene sheet with an activated gas. Activated gases can include, but are not limited to, oxygen or nitrogen that have been introduced into a plasma. In some embodiments, the plasma can be an atmospheric pressure plasma, such as an atmospheric pressure argon plasma or an atmospheric pressure helium plasma.

In various embodiments, the activated gas can be contacted with the graphene sheet for a length of time ranging between about 0.1 seconds to about 120 seconds. Longer contact times can be used, if desired. Factors that can influence the hole size obtained include, for example, the stand-off distance (i.e., the distance from the active gas source to the graphene sheet), contact residence time, active gas concentration, and the plasma power. The methods can be suitable for perforating multiple square meters of graphene sheets in a single operation. In any combination of factors, a desired hole size can be obtained using an atmosphere pressure plasma wherein the standoff values range from 1 to 20 mm; a residence time ranges from 0.1 to 120 seconds; an active gas range from 0 to 3% of the total amount of gas; and the applied plasma power ranges from 40 to 400 W/in$^2$. In one embodiment holes of between 0.5 to 1.75 nm with a majority at 1.1 nm can be obtained by utilizing a stand-off distance of about 1 mm, about a 3 second residence time, and about a 1% nitrogen gas with a power of about 80 W/in$^2$.

In some embodiments, the holes introduced to the graphene sheet can be about 100 nm or less in size. In some embodiments, the holes introduced to the graphene sheet can be about 10 nm or less in size. In some embodiments, the holes introduced to the graphene sheet can be about 5 nm or less in size. In some embodiments, the holes introduced to the graphene sheet can be about 2 nm or less in size. In some embodiments, the holes introduced to the graphene sheet can be about 1 nm or less in size. And in some embodiments the holes can range from about 0.5 nm to about 1.5 nm.

In some embodiments, the holes introduced to the graphene sheet can range from about 0.1 nm to about 100 nm in size. As previously mentioned, the interstitial aperture for a graphene sheet is 0.23 nm. However, in some embodiments a dangling carbon bond is not left from carbon removal. As a result a H, OH, NH, NH2 or other terminus is provided which in turn results in hole diameter of 0.1 nm that is smaller than the diameter of the interstitial aperture. In some embodiments, the holes introduced to the graphene sheet can range from about 0.1 nm to about 5 nm in size. In some embodiments, the holes introduced to the graphene sheet can range from about 0.1 nm to about 10 nm in size. In some embodiments, the holes introduced to the graphene sheet can range from about 0.5 nm to about 100 nm in size. In some embodiments, the holes introduced to the graphene sheet can range from about 0.5 nm to about 1.5 nm in size. In some embodiments, the holes introduced to the graphene sheet can range from about 0.5 nm to about 5 nm in size. In some embodiments, the holes introduced to the graphene sheet can range from about 0.5 nm to about 10 nm in size. In some embodiments, the holes introduced to the graphene sheet can range from about 1.5 nm to about 5 nm in size. In some embodiments, the holes introduced to the graphene sheet can range from about 1.5 nm to about 10 nm in size. In some embodiments, the holes introduced to the graphene sheet can range from about 1.5 nm to about 100 nm in size. In some embodiments, the holes introduced to the graphene sheet can be about 10 nm or more in size.

Figure 2:
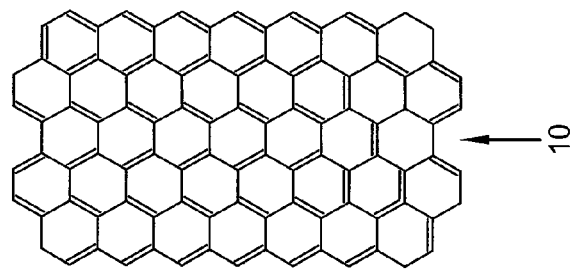
FIG. 2 shows an illustrative schematic demonstrating how graphene can be perforated with an activated gas.

FIG. 2 shows an illustrative schematic demonstrating how, utilizing the factors and their ranges previously mentioned, graphene can be perforated with an activated gas as designated generally by the numeral 20. As shown in FIG. 2, an active gas stream 22, which may be oxygen or nitrogen, can be exposed to plasma 24, which may be atmospheric pressure argon or helium plasma, to create activated gas stream 26. Activated gas stream 26 is then allowed to interact with graphene sheet 10 for a controlled length of time from 0.1 seconds to 120 seconds. Interaction of activated gas stream 26 with graphene sheet 10 produces perforated graphene sheet 30 having a plurality of holes 32 disposed therein. The periphery of the holes 32 supplemented with functional groups related to the process conditions. The functional groups (identified as X in FIG. 2) may be but are not limited to —H, —O, —OH, —N, —NH, —NH2. It is to be recognized that the number and disposition of holes 32 in FIG. 2 is meant to be illustrative and non-limiting. As discussed herein, the number and size of the perforations introduced within the graphene sheet can be modulated through varying a number of factors.

Figure 3:
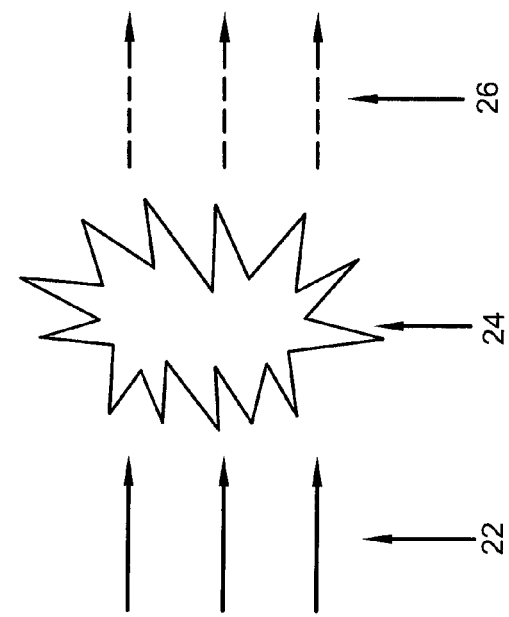
FIG. 3 shows a cross-sectional schematic diagram of a composite sheet of graphene and a supporting metallic substrate.
Figure 3:
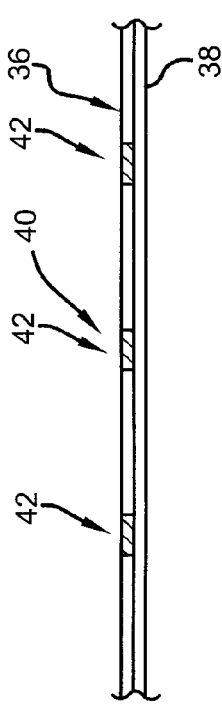

In some embodiments, as seen in FIG. 3, a graphene sheet 36, which is substantially the same as the graphene sheet 10, can be contacted with the activated gas while on a growth substrate 38 so as to form a composite sheet designated generally by the numeral 40. In some embodiments, the growth substrate 38 can be a copper substrate. In a manner similar to the previous embodiment, a gas stream activated by plasma is projected on to the composite sheet 40 and a plurality of appropriately sized apertures 42 are formed in the graphene sheet 36. In some embodiments, the graphene sheet 36 can be separated or transferred from the growth substrate 38 to another substrate or matrix following the introduction of holes thereto.

Figure 4:
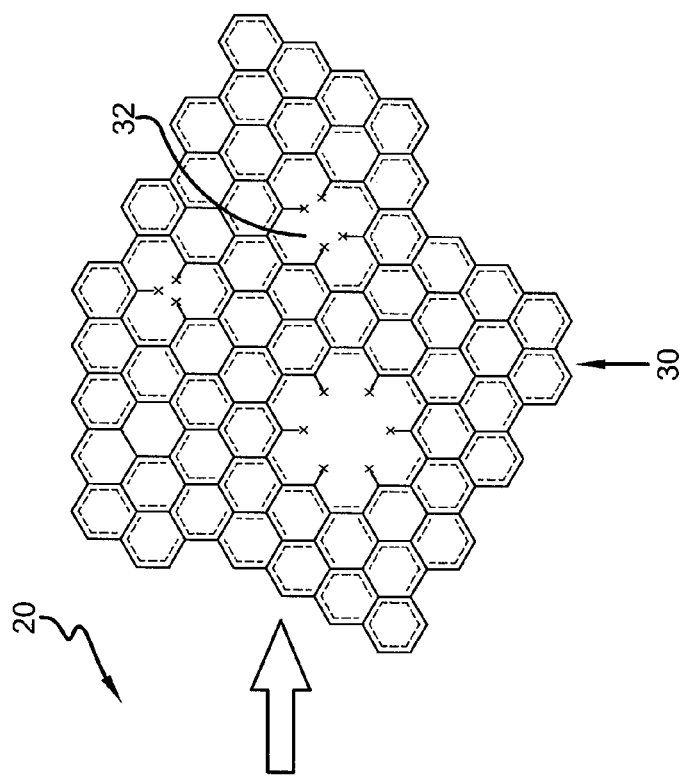
FIG. 4 shows a cross-sectional schematic diagram of a composite sheet of graphene and a supporting polymeric.
Figure 4:
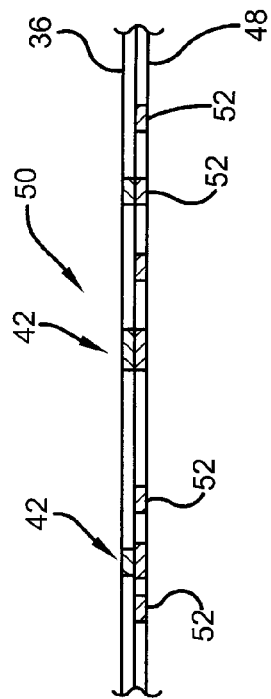

In some embodiments, as seen in FIG. 4, the perforated graphene 30/36 is transferred to a polymer matrix 48 to form a polymer composite 50. The polymer matrix 48 of the polymer composite 50 is not particularly limited, and any type of polymer matrix known in the art can be used. The polymer matrix 48 includes a plurality of holes 52 which need not be aligned with the apertures 42 of the graphene sheet 36. Moreover, the holes 52 are typically much larger than the apertures 42. The polymer matrix can be thermoplastic, thermosetting, or elastomeric. In some embodiments, the polymer composites containing the perforated graphene can be electrically conductive for use in sensor applications. In various embodiments, an amount of the perforated graphene within the polymer composites can range between about 0.1% to about 90% by weight of the polymer composite. Such an embodiment could be used to separate $CO_2$ from methane.

Based on the foregoing, the advantages of the present invention are readily apparent. Utilizing the disclosed methodology, a large number of consistently sized holes can be obtained through a graphene sheet. As a result, the graphene sheet can be provided with holes that reliably allow the passage of certain nano-sized components while blocking other components. As a result, graphene membranes used as fluid/gas filters can be used in a wide variety of applications. The disclosed process is also believed conducive for generating holes in graphene in a large scale manufacturing process.

Although the invention has been described with reference to the disclosed embodiments, one having ordinary skill in the art will readily appreciate that these are only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method for perforating graphene, comprising:
   exposing a stream of gas to an atmospheric pressure plasma to generate an activated gas stream downstream of, and separated from, the atmospheric pressure plasma, the stream of gas having a concentration of active gas and the active gas being selected from one of oxygen, nitrogen or combinations thereof;
   directing said activated gas stream separated from said atmospheric pressure plasma toward a graphene sheet; and
   perforating said graphene sheet with said activated gas stream.

2. The method according to claim 1, further comprising:
   controlling application of said activated gas stream to said graphene sheet to obtain desired aperture sizes in said graphene sheet.

3. The method according to claim 2, further comprising:
forming a composite sheet of said graphene sheet and a metallic substrate prior to said perforating step.

4. The method according to claim 2, further comprising:
forming a composite sheet of said graphene sheet and a polymeric substrate after said perforating step.

5. The method according to claim 1, further comprising: obtaining a desired aperture size of less than 5 nm in diameter.

6. The method according to claim 1, further comprising:
obtaining a desired aperture size of less than 10 nm in diameter.

7. The method according to claim 1, further comprising:
obtaining a desired aperture size of less than 1.5 nm in diameter.

8. The method according to claim 1, further comprising:
obtaining desired range of aperture sizes ranging from about 0.5 nm to about 1.5 nm in size.

9. The method according to claim 1, further comprising:
adjusting an amount of time said activated gas stream is applied to said graphene sheet so as to obtain a desired range of aperture sizes.

10. The method according to claim 1, further comprising:
adjusting a stand off distance between the genesis of said activated gas stream and said graphene sheet so as to obtain a desired range of aperture sizes in said graphene sheet.

11. The method according to claim 1, further comprising:
adjusting a distance between the genesis of said activated gas stream and said graphene sheet so as to obtain a desired aperture size in said graphene sheet.

12. The method according to claim 1, further comprising:
adjusting a contact residence time of said activated gas stream upon said graphene sheet so as to obtain a desired aperture size in said graphene sheet.

13. The method according to claim 1 further comprising:
adjusting an amount of plasma power applied to said activated gas stream so as to obtain a desired aperture size in said graphene sheet.

14. The method according to claim 1, further comprising:
utilizing no more than 3% active gas in said activated gas stream.

15. The method according to claim 1, further comprising:
obtaining a desired aperture size in said graphene sheet by adjusting at least one of the following:
an amount of time said activated gas stream is applied to said graphene sheet;
a distance between the genesis of said activated gas stream and said graphene sheet;
a contact residence time of said activated gas stream upon said graphene sheet; and
an amount of plasma power applied to said activated gas stream.

16. The method according to claim 9, wherein the time is from 0.1 to 120 seconds.

17. The method according to claim 10, wherein the standoff distance is from 1 to 20 mm.

18. The method according to claim 11, wherein the plasma power is from 40 to 400 W/in$^2$.

19. The method according to claim 1, wherein the active gas is oxygen.

20. The method according to claim 1, wherein the active gas is nitrogen.

* * * * *